United States Patent [19]

Cushman

[11] 4,299,464
[45] Nov. 10, 1981

[54] METHOD AND APPARATUS FOR REDUCING THE INCIDENCE OF EYE CLOSURES DURING PHOTOGRAPHING OF A HUMAN SUBJECT

[75] Inventor: William H. Cushman, Rochester, N.Y.

[73] Assignee: Eastman Kodak Company, Rochester, N.Y.

[21] Appl. No.: 175,212

[22] Filed: Aug. 4, 1980

[51] Int. Cl.³ .............................................. G03B 15/03
[52] U.S. Cl. ...................................... 354/137; 354/62; 354/354
[58] Field of Search .......................... 354/62, 137, 354

[56] References Cited

U.S. PATENT DOCUMENTS

| | | | |
|---|---|---|---|
| 1,866,581 | 7/1932 | Simjian | 354/60 |
| 3,171,057 | 2/1965 | Buckingham | 354/145 |
| 3,286,128 | 11/1966 | Ward | 315/241 |
| 3,465,656 | 9/1969 | Wick et al. | 315/241 P |
| 3,538,822 | 11/1970 | Gilmer | 354/75 |
| 3,666,964 | 5/1972 | Flynn . | |
| 3,681,649 | 8/1972 | Uno et al. | 315/151 |
| 3,684,917 | 8/1972 | Uno et al. | 315/241 P |
| 3,716,752 | 2/1973 | Iwata | 315/151 |
| 3,813,679 | 5/1974 | Hasegawa et al. . | |
| 3,836,924 | 9/1974 | Kawasaki | 354/33 |
| 3,842,428 | 10/1974 | Kawasaki | 354/145 |
| 4,149,787 | 4/1979 | Kobayashi et al. | 354/62 |

FOREIGN PATENT DOCUMENTS 1343676 1/1974 United Kingdom .
1462987 1/1977 United Kingdom .

OTHER PUBLICATIONS

"Professional Challenge–The Chronic Blinker", L. D. Peters, *The Professional Photographer*, Nov. 1979.

Primary Examiner—Russell E. Adams
Attorney, Agent, or Firm—D. R. Arndt

[57] ABSTRACT

A camera is used in combination with a photographic flash device and a delay mechanism for controlling the time when the camera shutter will open. A flash device on a camera generates a preliminary flash in synchronism with the depression of the camera's body release to induce the eyes of the subject to blink. A delay period is also initiated in the camera's controls to delay opening of the shutter. The duration of this delay is such that an exposure is not likely to be made until the refractory period after the evoked involuntary blink has been completed. At the end of this delay period, the shutter is allowed to open and a second flash may be generated to provide supplementary illumination. The camera may be an auto-ranging camera wherein camera-to-subject distance is determined electronically prior to opening of the shutter by sensing light from the preliminary flash, which has been reflected by the subject back to a sensor in the camera.

7 Claims, 6 Drawing Figures

METHOD AND APPARATUS FOR REDUCING THE INCIDENCE OF EYE CLOSURES DURING PHOTOGRAPHING OF A HUMAN SUBJECT

CROSS-REFERENCE TO RELATED APPLICATIONS

Reference is made to commonly assigned co-pending U.S. Applications Ser. No. 128,754, filed Mar. 10, 1980 in the names of R. J. Greenwald and L. J. Matteson and entitled AUTOMATIC RANGEFINDING DEVICE FOR USE IN A CAMERA, and Ser. No. 171,639, filed July 24, 1980, in the name of Jose M. Mir and entitled IMPROVED APPARATUS AND METHOD FOR MINIMIZING "RED-EYE" IN FLASH PHOTOGRAPHY.

BACKGROUND OF THE INVENTION

1. Field of the Invention

This invention relates to cameras, and more particularly to a device which can be used in or with a camera for the purpose of reducing the incidence of eye closures of an intended subject when the subject is being photographed.

2. Description of the Prior Art

Recent studies indicate that about one of every twenty photographs (5%) taken of a single human subject is unsatisfactory because the eyes of the subject being photographed were closed at the time the picture was taken. If a group of people are photographed, the number of unsatisfactory pictures increases in proportion to the number of persons in the group.

A voluntary blink cannot be distinguished objectively from one that is involuntary. For the most part, a blink is an unconscious, involuntary, periodic reflex movement. It is this involuntary blink response with which this invention is concerned.

For most individuals, provided that the conditions remain constant, the average value of the interval between successive blinks (inter-blink period) is remarkably constant. Blinking movements occur at intervals of from 2 to 10 seconds, with the average person blinking at a rate of approximately 12.5 blinks/min. with the blink lasting about 0.2–0.3 sec. This data suggest that vision is interrrupted about every 5 sec. with a 0.25 sec. blackout, which means that the average person is without vision 5–6% of his or her wakeful hours. The minimum interblink period (also called refractory period) for involuntary blinks induced by bright flashes of light is about 0.5 sec. or perhaps slightly longer. Each individual appears to have a definite rhythm, in which blinks occurring after short inter-blink periods (1 to 2 seconds) may sometimes be followed by a series of blinks having longer inter-blink periods (on the order of say 10 seconds); but for the same individual, the distribution of movements is very constant, provided the conditions remain constant. If an attempt is made to stop the movements voluntarily, an almost irresistible impulse to blink asserts itself within a short time. On the other hand, once the blink action starts, whether voluntarily or involuntarily, it completes its action without interruption.

This phenomenon of blinking has unexpected repercussions in many phases of human activity. One important consequence is in the art of photography, where the foregoing information shows that in a group of people having normal blinking behavior, a definite percentage (approximately 5%) of them will at any moment be in the act of blinking. This prediction is confirmed by the examination of group photographs. Thus, in any photograph of 40 people, one can usually expect to find 2 or 3 people with their eyes closed in the act of blinking; likewise with 20 people in the photograph, 1 or 2 would appear to have their eyes closed. A truly satisfactory solution to this problem has not yet been achieved.

SUMMARY OF THE INVENTION

The present invention employs a method and apparatus for reducing the incidence of eye closures during photographing of people to less than 1%. To accomplish this reduction, a camera is used in combination with a photographic flash device (such as a small electronic strobe flash unit) and a timer or delay mechanism for controlling the time when the camera's shutter will open. A flash is emitted from the flash device to induce a human subject to blink and after a suitable period following termination of the flash, the camera's shutter is opened to commence an exposure. The period is of such duration as to insure that a photographic exposure is not commenced until after the induced involuntary blink has been completed.

If the ambient illumination is low, it may be desirable to provide additional light at the time the shutter is opened in order to obtain a properly exposed photograph. Therefore, apparatus utilizing the invention may have the capability of producing two flashes with an interflash interval of the duration described above. The first flash induces a blink reflex and the second provides whatever supplementary illumination is necessary to insure proper exposure of the subject being photographed.

Another aspect of this invention is its use in conjunction with the electronic flash ranging systems that have been heretofore proposed and wherein camera-to-subject distances are determined electronically when light from a preliminary flash is reflected by a subject back to a sensor in the camera. It is proposed that the intensity of the ranging flash be sufficient to also consistently induce an involuntary blink by the subject. A 300 millisecond (msec.) delay period, for example, would follow the firing of the ranging flash before opening the shutter. During this interflash interval automatic focusing of the lens would occur and be completed before the shutter is actuated.

The invention and its features and advantages will be set forth and become more apparent in the detailed description of the preferred embodiment presented below.

DESCRIPTION OF THE DRAWINGS

In the detailed description of a preferred embodiment of the invention presented below, reference is made to the accompanying drawings, in which.

DESCRIPTION OF THE PREFERRED EMBODIMENTS

As stated above, recent evaluation of a large number of photographs has shown that about 5% of all photographs in which one person is pictured are unsatisfactory because the eyes of the person in the photograph appear to be closed. Thus, it can be seen that when two or more persons are photographed as a group, the probability that the eyes of at least one will be closed increases proportionally. Thus as a consequence of this normal function of blinking, a person, who happens to be photographed while making a voluntary or involuntary blink will appear in the photograph to have his or her eyes closed.

Following each blink is ½-1 second refractory period in which the eyes are unable to blink. Hence, the eyes of persons photographed during blink refractory periods will appear open in the photograph.

I propose that one may use the refractory period phenomenon to solve the eye closure problem by having the camera take pictures only during blink refractory periods. Theoretically, any device capable of generating a blink inducing stimulus could be used in conjunction with a camera that has the shutter opening delayed until the induced blink has been completed. However, it should be noted that the blink inducing stimulus could be a visual stimulus, an auditory stimulus or even a tactile stimulus. Bright flashes of light, loud sounds, and mechanical or thermal stimulation of the ear have all been known to induce involuntary blinking.

One of the preferred devices that could be used to practice the invention would be a small electronic strobe flash unit incorporating a delay timer which would delay the actuation of a camera shutter by about 300 msec. after firing of the flash. This delay insures that a picture is not likely to be taken until after the induced involuntary blink has been completed. In the event ambient illumination is low, it may be desirable to provide supplemental illumination. This could be accomplished by using a second electronic strobe flash unit synchronized with the operation of the camera shutter.

Figure 1:
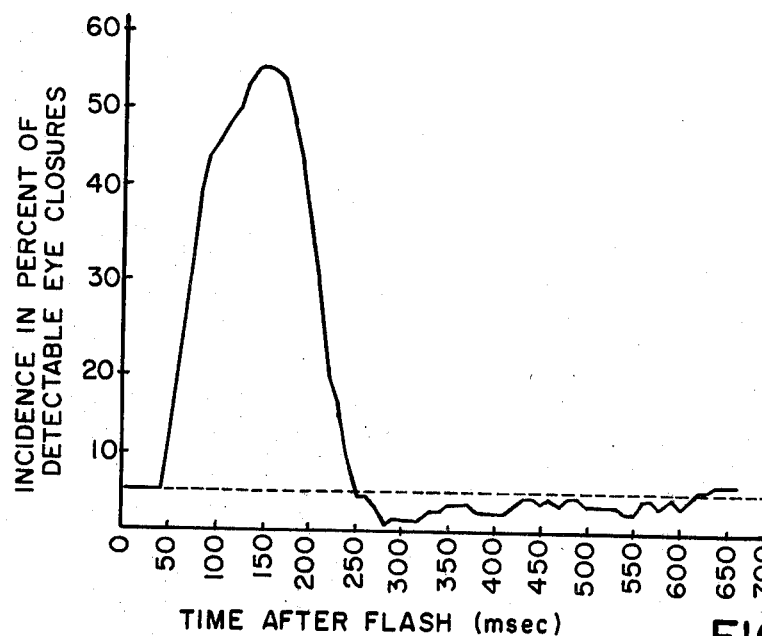
FIG. 1 is a graph illustrating the incidence of detectable flash induced eye closures as a function of time following a relatively brief blink inducing flash such as was produced by an electronic strobe flash unit.

With regard now to FIG. 1, a test was performed on 57 human subjects from age 18 to about 55 in a well-lighted room having ambient illumination of 690 lux. Each subject sat 8 feet (2.4 m.) from a camera equipped with a dual-flash madule. The blink inducing flash was triggered while the subject was looking directly at the camera. It should be noted that additional testing showed that the blink inducing flash was very effective even when the subject did not look directly at the flash of light. Consequently, the photographer need not be concerned about getting the subject to look directly at the camera. The output of the flash was 22 lux-sec. based on a product of corneal illuminance and time integrated over the duration of the flash. The mean luminance of the blink inducing flash was $1.9 \times 10^9$ cd/m$^2$ ($5.5 \times 10^8$ ft. L.).

A video system consisting of a television camera with a telephoto lens and a video tape recorder was used to record the movements of the subject's eyelids before and after the blink inducing flash. The video tape was then examined frame by frame to determine whether or not the subject had blinked. In the event the subject blinked, it was then possible to determine the latency or interval between flash onset and first detectable downward eyelid movement. Also determined were the time of maximum eye closure and blink duration. The resolution of the video system used was approximately 8 msec.

Analysis of the video records showed that induced blinks occured shortly after the preflash 56% of the time. The following table gives the mean, standard deviation and range for blink latency, maximum closure and blink duration for the 114 trails.

|  | Mean (msec.) | Standard Deviation (msec.) | Range (msec.) |
| --- | --- | --- | --- |
| Latency | 67 | 28 | 17–142 |
| Max. Closure | 131 | 20 | 75–175 |
| Blink Duration | 149 | 41 | 50–267 |
| Total Time | 216 | 27 | 150–284 |

Latency–Interval between flash onset and first detectable eyelid movment.

Max. Closure–Interval between flash onset and maximum eyelid closure.

Blink Duration–Interval between first detectable downward eyelid movement after flash and last detectable upward lid movement following max. closure.

Total Time–Latency plus blink duration.

With reference now to FIG. 1, it can be seen that 280 msec. after the preflash, the incidence of detectable eye closures was less than 1%. If photographs of normal human subjects had been taken at that time, statistically only 1 of 114 photographs would have been unsatisfactory because of eye closures. Without the blink inducing flash, 5% (dotted line) of the pictures, about 6 pictures, would be unsatisfactory because of eye closures.

Figure 2:
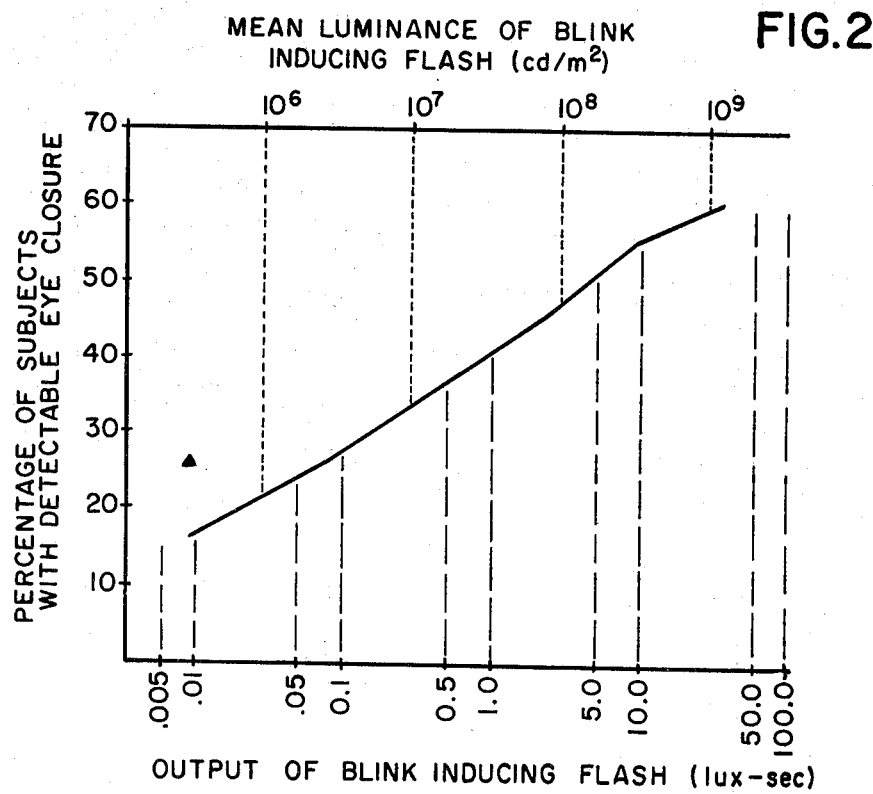
FIG. 2 is a graph illustrating the percentage of subjects with detectable flash induced eye closures as a function of the flash output (bottom scale) and flash luminance (top scale)

The blink inducing preflash appears to be capable of greatly reducing the incidence of pictures of people with their eyes closed. On a percentage basis the reduction observed was 83%. The data in FIGS. 1 and 2 show that the eye closure problem may be greatly reduced without increasing the intensity of the blink inducing flash to a level sufficient to cause all persons to blink. A blink inducing preflash need not be 100% effective to prevent eye closure in photographs. Fortunately, persons that do not blink reflexively in response to a blink inducing flash usually do not begin their next involuntary blink for at least 300 msec.

Although FIG. 1 shows that the incidence of eye closure detectable with the video system is below the 5% baseline for intervals between 250–610 msec., in terms of practical photographic applications the 250 msec. lower limit is probably an overestimate. It has been shown that there is relatively little eyelid movement during the last 30–50 msec. of a blink. The small amount of eye closure during this final phase would not be objectionable (and perhaps not even detectable) in a small print. Hence, it is likely that some benefit would be obtainable for delays as short as 220 msec. and perhaps even as short as 200 msec.

The procedure used to obtain the data for FIG. 1, i.e. frame by frame inspection of video recording tape, was found to be too time-consuming to be continued in subsequent studies and presented problems in low ambient light conditions.

Using a new procedure, subjects were photographed with a self-processing camera having a dual flash module. The blink inducing flash preceded the second flash (which was synchronized with the opening of the camera's shutter and will be referred to hereafter as the exposure flash) by 105 msec. Although the mean for maximum eye closure was found to be 131 msec., eye closure was more detectable in prints if the preflash preceded the exposure flash by 105 msec. This finding is attributable to the asymmetry of the blink response. The initial closure phase is much shorter than the reopening phase. Using the delay of 105 msec., subjects who reflexively blinked after the preflash had their eyes closed at the time the pictures were taken.

FIG. 2 shows that as flash output and luminance increase, the likelihood of an induced blink also increases. The relationship is approximately logarithmic as may be seen when it is noted that the scales for the horizontal axis are logarithmic.

The measured output of the flash when fully charged was 37 lux-sec. (luminance = $1.9 \times 10^9$ cd/m$^2$) at 5 ft. (1.5 m.). Induced blinks from the flash were observed for 60% of the subjects. Even at the other extreme, when the output of the preflash was reduced by a factor of 5,000, it was still found to be somewhat effective. Induced blink rates were 15%—three times as great as the expected mean percentage for a "no preflash" condition. This illustrates that a preflash can be beneficial in reducing the incidence of eye closures in pictures of people even when the luminance of the preflash is far below that of flashes produced by conventional electronic flash units.

The filled triangle in FIG. 2 represents a control in which the neutral filters used to create a 0.009 lux-sec. preflash were replaced with an infrared filter of equivalent photometric density (Kodak Wratten Filter No. 98B). Although photometrically equal, the predominately infrared flash appears to be somewhat more effective, suggesting that invisible radiation (infrared and perhaps ultra-voilet) may induce involuntary blinks. It may be equally likely that the subjects were more sensitive to near infrared radiations than the international standard observer.

Figure 3:
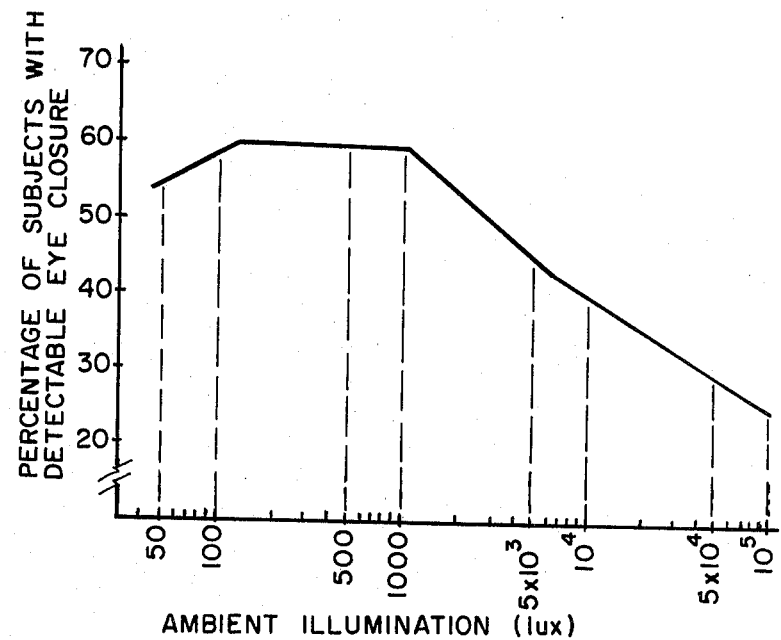
FIG. 3 is a graph illustrating the percentage of subjects with detectable flash induced eye closures as a function of ambient illumination.

It can be seen from FIGS. 1 and 2 that for indoor pictures the dual-flash device is very effective in reducing the incidence of pictures of people with their eyes closed. About half of all amateur photographs are taken indoors and the great majority of them are of people. The dual-flash device has a great potential to significantly improve a very large number of photographs. Its potential for outdoor pictures appears to be somewhat less due to the effect of high ambient illumination on the preflash blink rates shown in FIG. 3. Fortunately, relatively few outdoor pictures are pictures of people at a distance of 9 ft. (2.7 m.) or less. (Camera-to-subject distances of less than 9 feet possess the greatest potential for obtaining photographs where eye closures of the subjects are a problem. For pictures of people taken at more than 9 feet, the eye closures problem would not be as significant because the subject is too far away to properly observe the condition of the eyes.) In contrast, a majority of all indoor pictures are pictures of people at a distance of 9 ft. (2.7 m.) or less.

It was found that the effectiveness of a 37 lux-sec. flash at 5 ft. (1.5 m.) was no greater than a 22 lux-sec. flash at 8 ft. (2.4 m.). This indicates that blink rates are not affected by small changes in flash to subject distances and that corneal illuminance is not the most critical variable. The finding that blink rates were affected both by changes in ambient illumination (FIG. 3) and flash luminance (FIG. 2) suggests that retinal illuminance rather than luminance alone is the most relevant predictor.

In a group photograph the probability that at least one person will have his/her eyes closed increases almost linearly with the number of persons in the group. Accordingly, the greatest benefit from the dual-flash device may be derived when taking pictures of small groups. Such pictures include family portraits and pictures taken at weddings, parties, and other special group events.

The dual-flash assembly used to reduce the incidence of eye closure in photographs of people can be incorporated into a rangefinding apparatus which may be fabricated in a broad variety of configurations. When physically mounted within or upon a camera, however, the apparatus may comprise three basic functional components: a light source, a camera lens actuating system for providing focal adjustment, and intermediate control circuitry.

Figure 4:
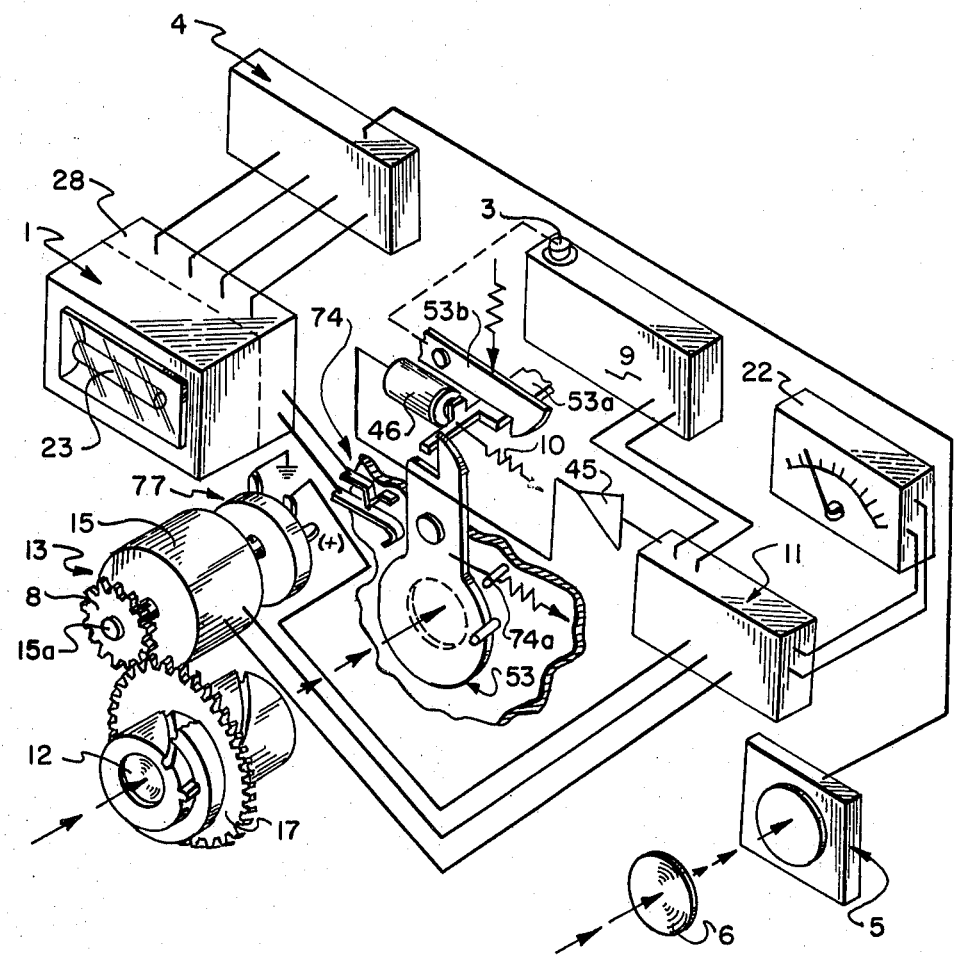
FIG. 4 illustrates diagrammatically a system that can be used for both measuring distance and reducing the incidence of eye closure in photographs of people.

Reference will be made to the rangefinding apparatus shown in FIG. 4. Light rays emanating from a light source 1, such as an electronic flash unit which is actuated by a body release 3, is allowed to impinge on the object of a photographic scene (not shown). A portion of light rays reflected back towards the camera can be collected by lens 6. These reflected light rays are then focused by the lens onto a light sensitive device 5 which may comprise a photovoltaic cell or photodiode. The device 5 also includes an integrating capacitor 7 (see FIG. 5) and thus is adapted to provide a measure of the total amount of light reflected by the subject.

When the amount of flash light collected by lens 6 reaches a predetermined level, a quench circuit 4 is activated which terminates the light emanating from the light source 1. Preferably the amount of light provided by the light source prior to quenching will be sufficient to induce involuntary blinks in at least 60% of subjects located at the useful close-up ranges of the camera, e.g. 3 to 9 feet. A timer 9 measures the elapsed time between depression of the body release 3 (and thus generation of the flash) and the generation of the quench signal. Converter means 11 translates the measured time interval into a range signal that is functionally related to the distance between the focusing device and the subject. This range signal is inputted to a lens system adjusting mechanism such as that shown generally at 13. A lens 12 is focused by causing axial translation of one or more of its lens elements. This translation is effected by operation of a DC servo motor 15 having a gear 8 on a shaft 15a which is operatively associated with a peripheral geared ring member 17 on the lens 12. Thus, operation of the motor 15 results in a corresponding change in the focus of the lens 12. A meter 22 may also be provided and could be coupled to the converter for indicating to the camera operator the determined range between the focusing device and the subject. After the lens has been properly focused, a shutter 53 is eventually released to allow the exposure to be made during the refractory period. The exposure could be either an available light exposure or the light source could be activated again at a much higher light output level, thereby providing the required artificial illumination for the exposure.

Figure 5:
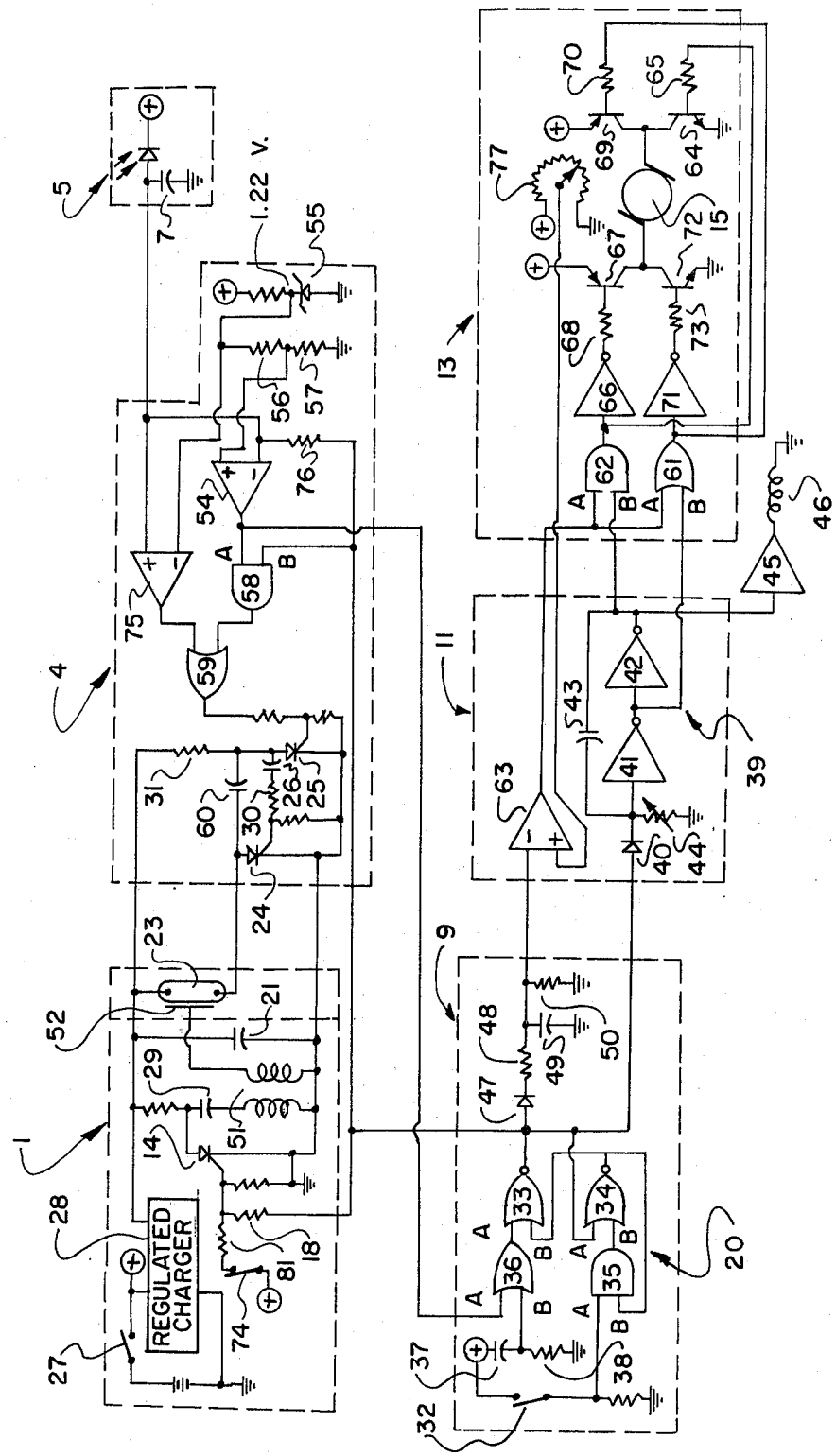
FIG. 5 is an electrical circuit diagram to be used in the system shown in FIG. 4.

FIG. 5 schematically illustrates in more detail the circuitry for a dual-flash automatic focusing device that allows a delay time to be varied between the preflash and the shutter actuation to reduce the incidence of eye closures in subjects and includes, among other things, an energy storage capacitor 21, a flashtube 23, two thyristors 24 and 25 each with its own ignition circuit, a switching capacitor 26 and an input signal derived from a quench circuit 4 that is controlled by the light sensitive device 5.

Closure of an on/off switch 27 activates a regulated charger 28 which in turn commences charging of the energy storage capacitor 21 to a voltage of approximately 330 volts. The on/off switch 27 may be actuated to the closed position by gripping of the camera by the operator or movement of a camera member that is responsive either to erecting of the camera or to moving of the flash device to its operative position. The regulated charger would continue to operate by suitable means (not shown) to regulate the voltage on the capacitor 21 either for an indefinite period of time or until turned off by folding of the camera or movement of the flash unit to its storage position. Alternatively, the charger may be automatically turned off if not operated within a predetermined period of time from the last exposure or flash operation. During charging, a trigger capacitor 29 is brought to the same voltage potential as capacitor 21. This potential is also applied across the electrodes of the flashtube 23 that is in series with the thyristor 24 which is normally blocked (or off). The voltage potential on the capacitor 21 is equally applied to the switching capacitor 26 via the resistors 30 and 31. This voltage potential is equally applied to the anode of the thyristor 25, which is normally blocked, via the resistor 31.

The preflash or ranging flash is initiated by the closure of trigger switch 32 which is actuated by travel of the body release 3 to a first position. Prior to actuation of the switch 32 or in response to an initial movement of body release 3, a flip-flop 20 comprised of NOR gates 33 and 34 is in a re-set condition with the output of NOR gate 34 at a logic high. Closure of switch 32 results in a positive voltage on the A input of AND gate 35. This results in a change in the re-set flip-flop so that the output of NOR gate 33 is at a logic high and the output of NOR gate 34 is at a logic low thereby causing the B input of AND gate 35 to go low which changes the output of AND gate 35 to a logic low. With the high pulse removed from the B input of NOR gate 34, the flip-flop will remain in the set state; that is, with the output of NOR gate 33 high and the output of NOR gate 34 being at a logic low. This means that subsequent actuation of trigger switch 32 from bouncing or jittery fingers will have no effect on the output of the flip-flop until a reset pulse is received at input A of OR gate 36.

The high output of NOR gate 33 is sensed by a circuit shown generally at 39. This circuit includes a diode 40 and inverters 41 and 42. The output of inverter 41 goes to a logic low in response to the high output of NOR gate 33 and in turn causes the output of inverter 42 to go to a logic high. Capacitor 43 provides feedback from the output of inverter 42 to the input of inverter 41 and holds this input high for some period of time after the output of NOR gate 33 returns to its normal logic low state. When the NOR gate 33 returns to its logic low state, diode 40 prevents charge from being drawn off capacitor 43 to NOR gate 33. Thus, the charge on capacitor 43 must bleed through a variable resistor 44.

Accordingly, the time constant established by variable resistor 44 and capacitor 43 determines the duration that an enable pulse or logic high exists at the output of inverter 42, which subsequently controls the delay between the preflash and the initiation of exposure (and, if needed, the second flash). This enable pulse performs two functions: firstly, it determines how long power will be available to the motor 15 that focuses the lens 12 (FIG. 4) (this will be discussed in detail shortly); secondly, it is used to turn on an amplifier 45 the output of which energizes a holding solenoid 46. While the enable pulse is present, the amplifier 45 keeps the solenoid energized and prevents a shutter opening lever 53a from moving under the force of a spring 10 and thus the shutter blade 53 is prevented from opening even though it was mechanically released from a latch 53b (see FIG. 4) at the time the body release was pressed. This ensures that the picture is not taken until after the motor has had an opportunity to focus the lens and the subjects have completed their blinks. The delay period should be adjusted, for best results in reducing eye closure of subjects, to about 280 msec.

With the output of NOR gate 33 going to a logic high, current starts flowing through diode 47 and resistor 48. In response to this current, timing circuit 9 starts a timing operation via time integrating capacitor 49. A predetermined rate of charging is established by the time constant formed by resistor 48 and capacitor 49. The current will continue to flow until the output of NOR gate 33 goes to a logic low; at that time the diode 47 will be back biased preventing current from flowing out of capacitor 49 back into NOR gate 33. The voltage on capacitor 49 is inputted to the negative input of a voltage comparator 63 and will remain relatively constant even though it is allowed to discharge very slowly through parallel resistance 50 which has a relatively high resistance.

SCR 14 is also triggered via resistor 18 into conduction by the output of NOR gate 33 going to a logic high in reponse to closure of trigger switch 32, resulting in the discharge of trigger capacitor 29. Current from the capacitor is thus caused to flow through the primary winding of trigger transformer 51. Current flow in the primary results in an induced current pulse in the secondary and trigger electrode 52, resulting in the ionization of the gas in the flashtube 23. As a result of this ionization, there is a large change of voltage per unit time at the anode of thyristor 24 which is sufficient to cause the thyristor to conduct. As soon as the thyristor 24 conducts, the discharge current from capacitor 21 in the flashtube 23 is established.

The discharge in the flashtube 23 results in illumination of the subject and a portion of the light thereof is reflected towards lens 6 and sensed by the light sensitive device 5 which in turn generates a current that charges capacitor 7. The voltage on the integrating capacitor 7 is inputted to the negative input of a comparator 54. When this voltage has reached a value equal to a level determined by a reference voltage applied to the positive terminal of the comparator 54, the output thereof goes to a logic high. Because the ranging flash need not be as long as the exposure flash, a substantial amount of energy may be saved by terminating or quenching the flash earlier and thereby maintaining whatever energy may be left in the capacitor 21 for the exposure flash. Therefore instead of using a reference voltage of 1.22V established by zener diode 55 a lower voltage is used, one established by a voltage divider consisting of resistors 56 and 57 which are used to reduce the level at which the device will operate to terminate or quench the ranging flash.

A logic high level signal at the output of comparator 54 resets the flip-flop 20 when the logic high is inputted to terminal A of OR gate 36 as mentioned earlier. This results in the output of NOR gate 33 going to a logic low; stopping the time integration by capacitor 49.

In addition, the logic high level signal at the output of comparator 54 causes the output of AND gate 58 to go to a logic high which in turn results in the output of OR gate 59 going to a logic high and turning on the control electrode of the commutating thyristor 25. When thyristor 25 begins to conduct, it results in the discharge of capacitor 60 into thyristor 24. The voltage on the anode of the thyristor 24 is thus inverted during the duration of the discharge of the capacitor 60 and the thyristor 24 ceases to conduct. Because thyristor 24 stops conduction, the discharge current is interrupted, the tube de-ionizes, and the flash extinguishes. As soon as the discharge currents of the capacitors 60 and 26 become low enough, the thyrsitor 25 is blocked and the whole system goes back to the initial state. Furthermore, the ignition of the thyristor 25 generates a negative pulse to the control electrode of the thyristor 24 due to the capacitor 26 via resistor 30, which has an effect of diminishing the turnoff time of the thyristor 24.

After the ranging flash has been extinguished and the flip-flop 20 has been re-set, there is a stored charge on capacitor 49 in the timer 9 that is representative of the distance of the object from the camera, by virtue of being a measure of the time that it took to generate a quench signal for the ranging flash.

It should be noted that when an enable or logic level high signal is present on the output of an inverter 42, a logic low is on the output of inverter 41; the output of these inverters are inputted to the B inputs of AND gate 62 and OR gate 61, respectively. These B inputs establish the time when the motor commences to run. The direction that the motor will turn is determined by the output of comparator 63.

As may be recalled, the negative input terminal of comparator 63 senses the voltage potential on capacitor 49 and compares it with the voltage potential on the positive input terminal which is derived from potentiometer 77. The position and potential of the potentiometer's movable contact terminal is representative of lens position. The system will function to make the two voltages inputted to comparator 63 match. This is accomplished by operating the motor which also moves the potentiometer's movable contact terminal so that its output will match the voltage stored in capacitor 49. The turns on the potentiometer are configured in a non-linear fashion to match the charge characteristics of capacitor 49. Therefore if the difference between the voltages at the positive and negative input terminals of comparator 63 are positive, the output will go to a logic high. On the other hand, if the difference between the voltages is negative, then the output will be a logic low.

When the outputs of comparator 63 and inverter 42 are each at a logic high signal level it results in AND gate 62 having a logic high on both its A and B inputs. This causes the output of the AND gate to go to a logic high which is impressed on the base of NPN transistor 64 via a resistor 65 causing transistor 64 to conduct. The logic high at the output of AND gate 62 is inputted to inverter 66 which outputs a logic low that is impressed on the base of PNP transistor 67 via resistor 68, thus causing conduction of transistor 67. In response to this conduction, current flows from the positive supply on the emitter of transistor 67 through the emitter-collector junction of transistor 67 and the motor 15 to ground via transistor 64, thereby causing the motor 15 to rotate in a first direction.

During the time that motor 15 is rotating in a first direction, the following conditions exist in the remainder of the motor control circuit. Input A of OR gate 61 is at a logic high as a result of the output of comparator 63 being at a logic high. Input B of OR gate 61 is at a logic low because the output of inverter 41 is at a logic low when the flip-flop 20 is reset after quenching of the ranging flash. Thus, the output of OR gate 61 is at a logic high which in turn is impressed on the base of PNP transistor 69 via resistor 70 rendering the transistor non-conductive. The logic high at the output of OR gate 61 is also inputted to inverter 71, the output of which is a logic low which in turn is impressed on the base of NPN transistor 72 via resistor 73 rendering the transistor non-conductive.

There will now be considered the other possible condition that may exist while an enable pulse is present at the output of inverter 42, i.e. where the output of comparator 63 is a logic low. This would occur where the positive input coming from the potentiometer 77 is less than the negative input of the comparator 63 derived from the output of timing capacitor 49. Looking at AND gate 62, it can be seen that the A input would be at a logic low and the B input would be at a logic high and therefore the output of the AND gate 62 would be a logic low. A logic low output at AND gate 62 results in the base of NPN transistor 64 receiving a low voltage via resistor 65 and the base of PNP transistor 67 receiving a logic high voltage through inverter 66 and resistor 68. Therefore, both transistors 64 and 67 are rendered non-conductive. OR gate 61 would have a logic low on input A from comparator 63, and a logic low on input B from inverter 41 so that the output of OR gate 61 would be a logic low. Thus, a logic low would be present on the base of PNP transistor 69 via resistor 70. A logic high would be present at the output of inverter 71 which in turn is applied to the base of NPN transistor 72 via resistor 73. Thus, it can be seen that both transistors 69 and 72 would be rendered conductive allowing current to flow from the positive supply on the emitter of transistor 69, through the transistor 69, through motor 15 and finally through transistor 72 to ground, thus causing the motor to rotate in a second direction.

Once the enable pulse is present, the motor can begin rotation with the direction of rotation being determined by the logic state of the output of comparator 63. The enable pulse will be present for approximately 280 msec. This period of time is sufficient for the motor to travel the maximum distance that it will ever have to travel to focus the lens, which is from the lens near position to the lens far position. After focusing has taken place, and the 280 msec. period has elapsed, the enable pulse will be removed causing amplifier 45 to de-energize the solenoid 46 that holds the shutter opening lever 53a; thus, the shutter will open under the influence of spring 10 initiating the exposure period. Release of the shutter blade mechanically operates the x/synch. switch 74 when the shutter hits the rebound pin 74a (FIG. 4), which will again trigger SCR 14 into conduction by applying a positive voltage to the trigger electrode through resistor 81. Capacitor 29 which has had an opportunity to become re-charged during the 280 msec. interval, once again begins to discharge through SCR 14 and the primary winding of the trigger transformer 51. The induced pulse in the secondary causes the flash to fire, as previously described. It should be noted that a substantial amount of charge remains in the main discharge capacitor 21 because only a relatively small amount of energy is necessary for ranging and blink inducing purposes.

Firing of the flashtube 23 the second time once again results in the illumination of the object and the reflected light is received by the light sensitive device, which in turn generates a current that charges capacitor 7. That voltage is applied to the positive input of photoflash quench comparator 75. When the voltage on the integrating capacitor 7 has reached a value equal to a reference voltage of 1.22V established by zener diode 55 applied to the negative input of a comparator 75, the output of that comparator will go to a logic high. Because maximum light output is required for the exposure flash, the full reference voltage of 1.22V established by zener diode 55 is inputted to the negative input of comparator 75.

The logic high on the output of comparator 75 is inputted to OR gate 59 causing its output to go to a logic high and turn on the control electrode of the commutating thyristor 25. This results in the quenching of the flash after the proper amount of light has illuminated the subject being photographed so as to insure the proper exposure. The actual quenching operation has been described in detail earlier.

There are events that if they occurred, would tend to disturb the sequence of operation previously described. One such event could result if the trigger switch 32 had been closed prematurely by depression of the body release 3; that is, before the energy storage capacitor 21 had a chance to become fully charged. In such a case, when SCR 14 is turned on there would not be enough energy available to trigger the flashtube. However, the logic circuitry would continue to function even though the flash failed to fire. Because the flash unit did not fire, the photocell 5 would not receive any reflected light so that the capacitor 7 would not commence charging and would never reach the level of the reference voltage being inputted to comparator 54. This would prevent the output of comparator 54 from going to a logic high, a condition that would ultimately result in the quenching of the ranging flash. Because there would be no quench, the time integrating capacitor 49 would continue to charge for an indefinite period of time. To prevent the foregoing from happening, a current limiting resistor 76 allows a small amount of current to flow from the output of NOR gate 33 through resistor 76 to integrating capacitor 7 when the output of the NOR gate is at a logic high in response to the closure of the trigger switch 32. This current is very small so that it does not impart substantial error to the measurement of the photocurrent. This current flow establishes a maximum time interval for the timing capacitor 49. This maximum time period corresponds to the maximum range that the system would focus. It is also possible to sense this condition in a manner not shown so that when this condition exists, the camera viewfinder may be obscured by a liquid crystal device to dissuade the operator from initiating an exposure under this condition, particularly if the intended scene to be photographed has people in it and eye closures of the subjects are to be kept to a minimum.

A second condition that is even more likely to occur is that the flashtube might go off when the ranging flash is fired but no light is reflected from the subject (i.e. mountains in the distance), because the object is at too great a distance. Once again, no current would be integrated by the capacitor 7 so that comparator 54 would not output a logic high required to quench the ranging flash. Again, the small current through resistor 56 is used to slowly charge capacitor 7 during a predetermined maximum time interval. It is this time interval that determines the duration of the ranging flash. If the duration of the ranging flash is not controlled, the flashtube will continue to drain energy from the discharge capacitor until depleted to the point that no energy is available for the exposure flash. Under such a condition, it would be unlikely that a person in the scene would be near enough to the camera that the condition of his or her eyes could be observed in the photograph.

Resistor 76 is also used to discharge capacitor 7 to its zero-volt initial condition before actuation of the main flash, which is a necessary requirement for accurate measurement of the reflected scene light.

Figure 6:
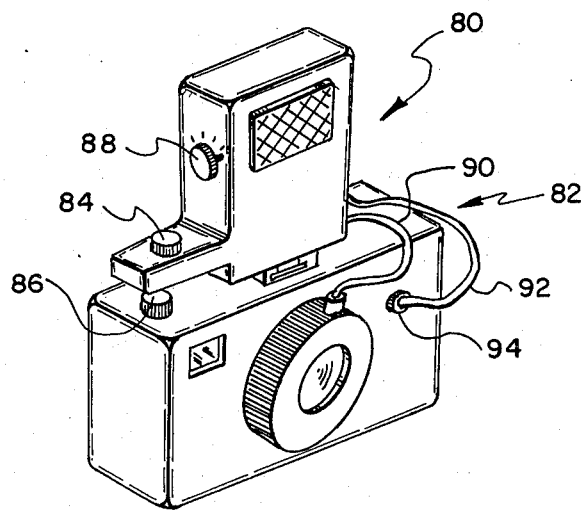
FIG. 6 illustrates how a modified flash device could be used in conjunction with a camera to practice the invention.

All elements that are necessary to a device for reducing the incidence of eye closures in photographs of people could be contained in an electronic strobe flash unit of the type illustrated in FIG. 6. The flash unit 80 is intended to be mounted on a camera 82 in a conventional manner. A button 84 on he flash unit is intended to be used in lieu of the body release 86 on the camera when eye closure reduction of the subject is desired. During operation, the operator would depress the button 84 on the flash unit (instead of the body release on the camera) causing the flash unit to emit a flash of light of sufficient intensity to evoke a blink from the photographic subject. Simultaneously, a timer delay mechanism in the flash unit is activated. The duration of the delay could be either fixed or varied by adjustment of control 88. After the requisite time delay, the camera shutter is actuated through the camera's external input via cable 90. This can be done with or without the use of a second flash depending upon the ambient lighting conditions. When used, the exposure flash can be triggered in a conventional manner via cable 92 which is connected to the x/synch. socket 94 on the camera to synchronize the flash with the opening of the camera shutter.

Thus, it is apparent that there has been provided, in accordance with the invention, a method and apparatus that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. A method for reducing the incidence of eye closures of a human subject during a photographic exposure of the subject, comprising:
   generating a flash of light prior to commencement of the exposure to induce the subject to blink; and
   commencing the photographic exposure from between 240 msec. to 300 msec. following termination of the flash.

2. A method for making a photographic exposure of a human subject, comprising:

generating a flash of light to induce the subject to blink prior to the exposure;

commencing the photographic exposure from between 240 msec. to 300 msec. following termination of the flash; and generating a second flash of light during the exposure to provide supplemental illumination for photographing the subject.

3. An apparatus for use with a camera to reduce the incidence of eye closures of a human subject during a photographic exposure of the subject, said camera having a shutter to control the photographic exposure, said apparatus comprising:

means for producing a flash of light for inducing the subject to blink;

delay means for delaying the opening of said shutter for a predetermined time which is sufficient to allow the subject's eyes reopen, said predetermined time not exceeding 300 msec.

4. The invention according to claim 3 wherein the delay means is activated by said flash means.

5. A blink reduction apparatus for use in combination with a camera having a shutter and means for operating said shutter to produce a photographic exposure, said apparatus comprising:

light-emitting means producing a flash of sufficient magnitude to evoke a blink;

delay means for establishing a delay period in the range of 240 msec. to 300 msec.; and trigger means initiating operation of the camera shutter for an exposure upon termination of said delay period.

6. A camera for reducing the incidence of eye closures in photographs of people, said camera having a shutter for use in producing photographic exposures, said camera comprising:

preparatory flash means for producing a flash of light to cause a photographic subject to blink;

delay means for establishing a delay period not in excess of 300 msec. to allow the subject's eyes to reopen; and shutter actuation means responsive to the termination of said delay period for opening said shutter.

7. The invention according to claim 6 wherein the delay means is activated by said preparatory flash means.

* * * * *

UNITED STATES PATENT OFFICE
CERTIFICATE OF CORRECTION

PATENT NO. : 4,299,464
DATED : November 10, 1981
INVENTOR(S) : William Howard Cushman It is certified that error appears in the above-identified patent and that said Letters Patent are hereby corrected as shown below:

| | |
|---|---|
| Column 3, line 55 | "madule" should read --module-- |
| Column 4, line 15 | "trails" should read --trials-- |
| Column 5, line 39 | "98B" should read --89B-- |
| Column 13, line 18 | after "eyes", insert --to-- |

Signed and Sealed this

Ninth Day of February 1982

[SEAL]

Attest:

GERALD J. MOSSINGHOFF

Attesting Officer    Commissioner of Patents and Trademarks